United States Patent [19]

Verhoeven et al.

[11] Patent Number: 4,481,963

[45] Date of Patent: Nov. 13, 1984

[54] DROP COLLECTOR FOR AN APPARATUS FOR CONVEYING ELECTRODES

[75] Inventors: Constant T. Verhoeven, Poederlee; Jean-Francois Viellefont, Herenthout; Robert Dierckxsens, Olen, all of Belgium

[73] Assignee: Metallurgie Hoboken-Overpelt, Hoboken, Belgium

[21] Appl. No.: 502,215

[22] Filed: Jun. 8, 1983

[30] Foreign Application Priority Data

Feb. 22, 1983 [LU] Luxembourg .......................... 84654

[51] Int. Cl.³ ................................................ B08B 3/04
[52] U.S. Cl. .................................................. 134/104
[58] Field of Search .................. 134/104, 135, 76, 82, 134/117, 119

[56] References Cited

U.S. PATENT DOCUMENTS

| 2,417,634 | 3/1947 | Cozzoli | 134/104 |
| 3,887,094 | 6/1975 | Ikeda et al. | 134/76 |
| 4,248,353 | 2/1981 | Budzich et al. | 134/135 |

FOREIGN PATENT DOCUMENTS 7122436  3/1972  France .
1348490  3/1974  United Kingdom .

Primary Examiner—Stephen Marcus
Assistant Examiner—Renee S. Kiderf
Attorney, Agent, or Firm—Pennie & Edmonds

[57] ABSTRACT

In an apparatus for conveying dripping electrodes, a drop collector having a plurality of parallel gutters is coupled to the conveying apparatus by a frame. The gutters are coupled together in one or more series of parallel gutters and are displaced by a motor driven endless chain system between a work position underneath the suspended dripping electrodes and a rest position which permits the electrodes to be inserted into or extracted from electrolysis cells by the conveying apparatus. The gutters include outlet orifices which communicate electrolyte from the dripping electrodes to a reservoir formed in the frame which couples the drop collector to the conveying apparatus.

13 Claims, 10 Drawing Figures

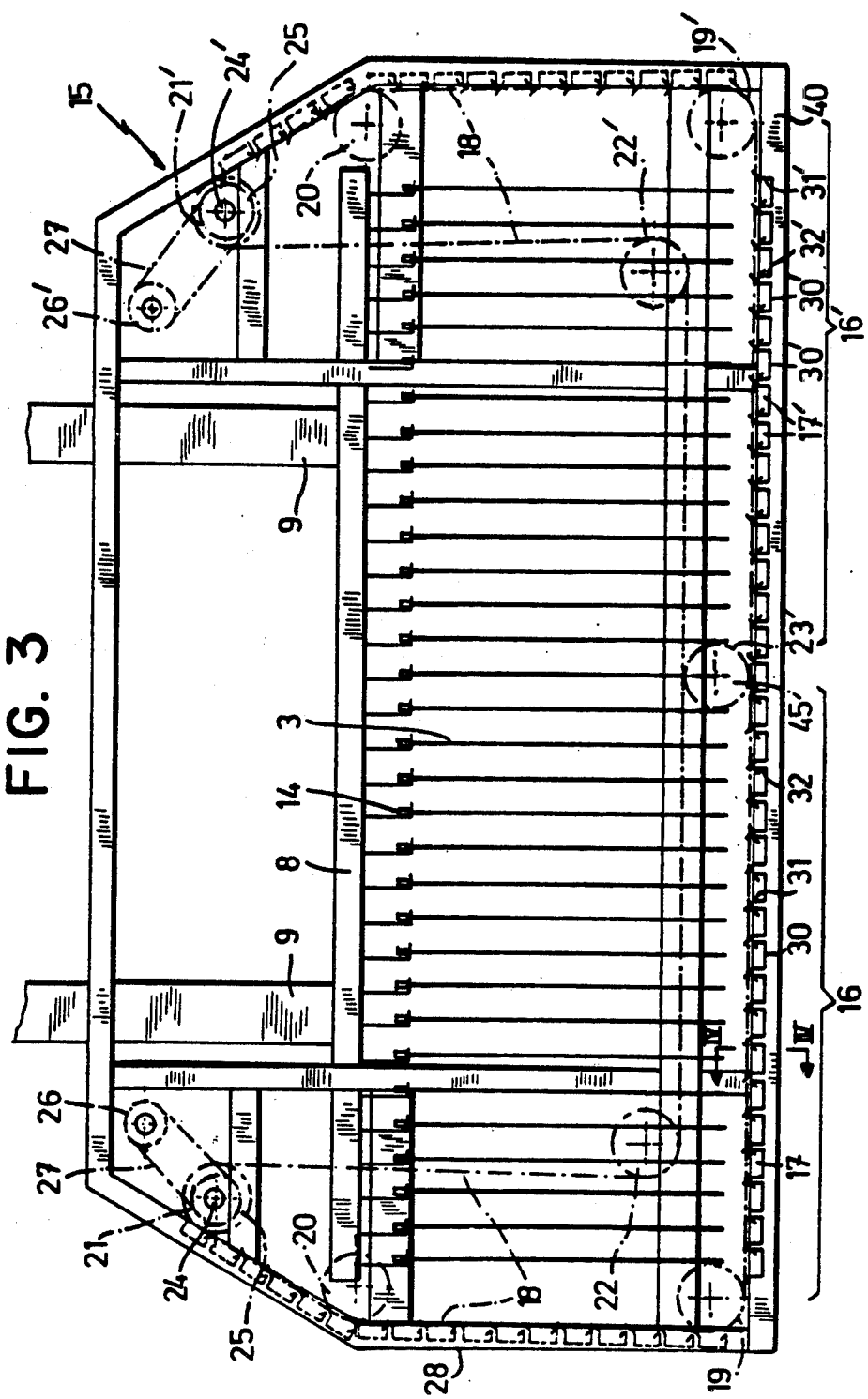

DROP COLLECTOR FOR AN APPARATUS FOR CONVEYING ELECTRODES

BACKGROUND OF THE INVENTION

1. Field of Invention

The present invention relates to a drop collector for an apparatus for conveying dripping electrodes, e.g. electrodes lifted from an electrolysis cell. An apparatus for conveying dripping electrodes typically includes a carriage and a rack for suspending the electrodes and a device for collecting the liquid dripping from the electrodes.

2. Description of the Prior Art

A known drop collector for such a conveying apparatus consists of a pair of giant dishes and of articulated operating means fastened to the carriage for bringing the dishes from a rest position, in which the dishes are located at both sides of the group of electrodes suspended from the rack, to a work position, in which the dishes are located under the group of electrodes and vice versa. This type of drop collector is encumbering and thereby hinders the operator of the conveying apparatus and the workers engaged in the tankhouse in which the conveying apparatus is located.

SUMMARY OF THE INVENTION

The drop collector of the present invention avoids the drawbacks of the prior art drop collector. The drop collector of the present invention includes a series of parallel gutters which are disposed in operative relationship to a conveying apparatus which is capable of inserting and extracting a plurality of electrodes into and out of electrolysis cells. Preferably a motor driven device having a pair of endless chains coupled to the gutters brings the series of gutters: (1) from a lower work position, in which the gutters are juxtaposed and located under the electrodes, suspended from the conveying apparatus; (2) through an intermediary position, in which the series of gutters is curved; (3) to a higher rest position, in which the gutters are superposed, and vice versa. When the series of gutters is in the work position, outlet orifices in the gutters communicate with a reservoir located underneath the gutters to collect liquid dripping from the electrodes. A frame is fastened to the carriage of the conveying apparatus, and the gutters, the motor driven device and the reservoir are coupled thereto.

BRIEF DESCRIPTION OF THE DRAWINGS

FIG. 3 is an enlarged elevational lateral view of the rack for electrodes and of the drop collector of FIG. 2;

DESCRIPTION OF THE PREFERRED EMBODIMENTS

Figure 1:
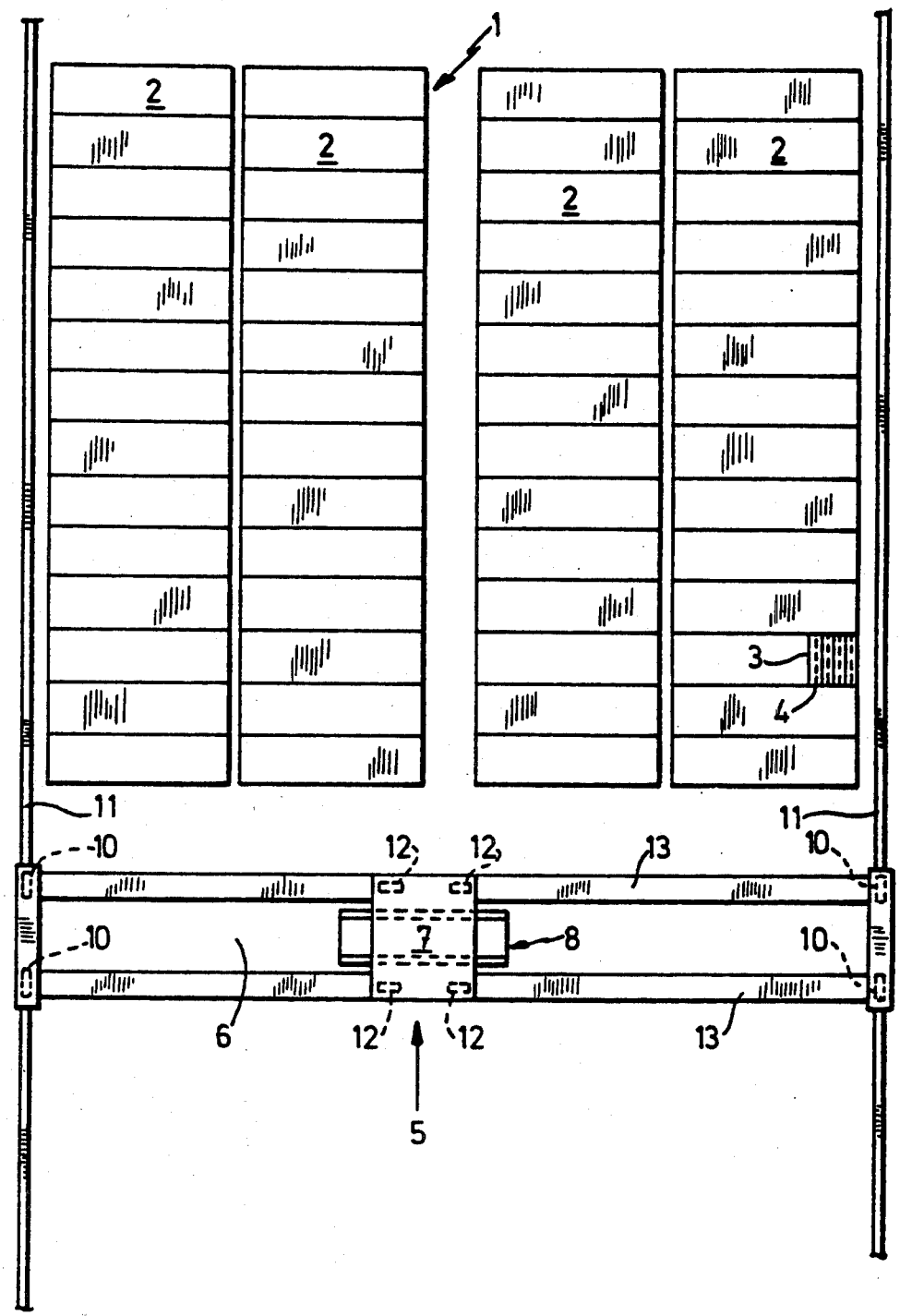
FIG. 1 is a schematic plan view of a tankhouse comprising electrolysis cells and a conveying installation for conveying electrodes that have to undergo electrolysis to the electrolysis cells and for removing electrodes that have undergone electrolysis from the electrolysis cells.

As shown in FIG. 1, tankhouse 1 comprises several parallel rows of rectangular electrolysis cells 2 positioned side by side. Each electrolysis cell 2 comprises a group of cathodes 3 and alternating herewith a group of anodes 4. These electrodes are suspended vertically at equal distance from one another and transverse to the longitudinal axis of the cell. They consist of a metal plate provided with elements (lugs, suspension-bar, openings) enabling their suspension in cells 2 and their handling by a rack. An appropriate electrolyte flows through cells 2 and an appropriate electric current passes through the cells. Moreover, tankhouse 1 comprises a conveying installation 5 for electrodes. This includes an overhead crane 6 equipped with a carriage 7 that bears a known and non-represented lifting device to which is suspended a rack 8 equipped with guiding elements 9 (see FIG. 3). Hence, this rack 8, which, as the case may require, is either a rack for cathodes, or a rack for anodes or a rack for cathodes and anodes, can be moved vertically. Overhead crane 6, equipped with wheels 10 and driven by a non-represented motor, is adapted to move to-and-fro on rails 11 parallel to the rows of cells. Carriage 7, equipped with wheels 12 and driven by a non-represented motor, is adapted to move to-and-fro on rails 13 attached to crane 6, perpendicular to the rows of cells. Conveying apparatus 5 starts operating, when the electrodes 3 and/or 4 in cells 2 have to be replaced by new electrodes, e.g. when cathodes 3 have to be replaced by starting cathodes.

A rack 8 for cathodes, e.g. a conventional rack with hooks 14 (see FIG. 2 and 3) is then brought above cell 2 by means of crane 6 and carriage 7. Rack 8 is lowered, cathodes 3 are hooked and the rack with cathodes 3 is lifted. Lifted rack 8 with cathodes 3 hooked thereon is then conveyed by means of crane 6 and carriage 7 to a station for treating cathodes that have undergone electrolysis. While cathodes 3 are conveyed in this way, electrolyte is dripping thereoff. Conveying installation 5 is equipped with a drop collector 15 in order to avoid that this electrolyte, that mostly consists of a corrosive liquid, falls on the floor of tankhouse 1 or on the equipment in the tankhouse.

Figure 2:
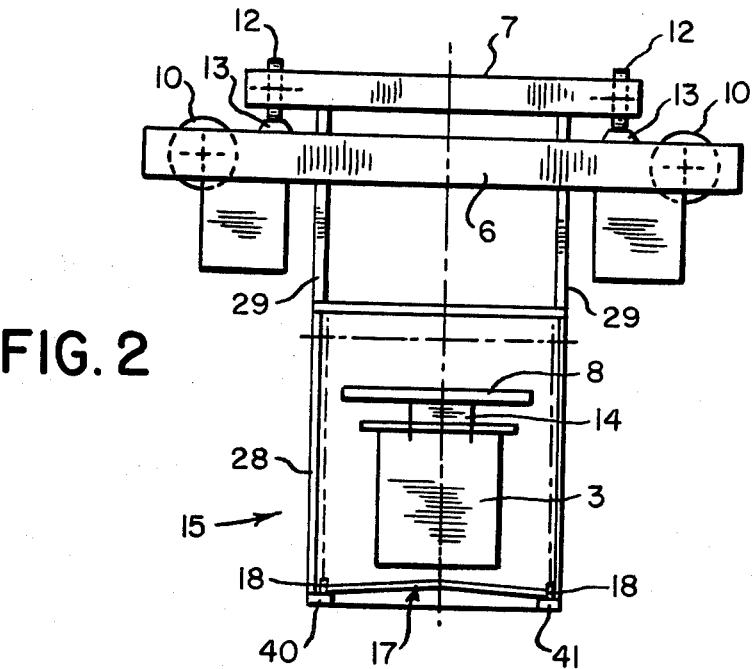
FIG. 2 is an enlarged lateral view of the conveying installation of FIG. 1, this installation includes a rack for electrodes and a drop collector according to the invention.
Figure 4:
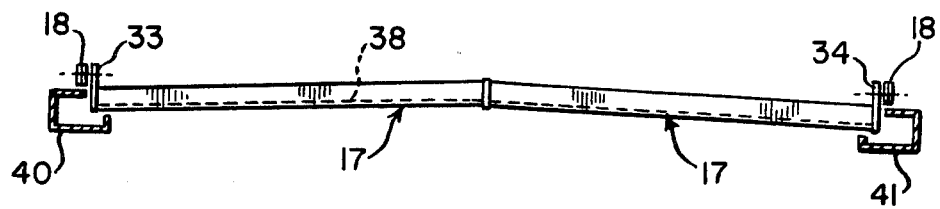
FIG. 4 represents a section made along line IV—IV through the drop collector of FIG. 3.
Figure 8:
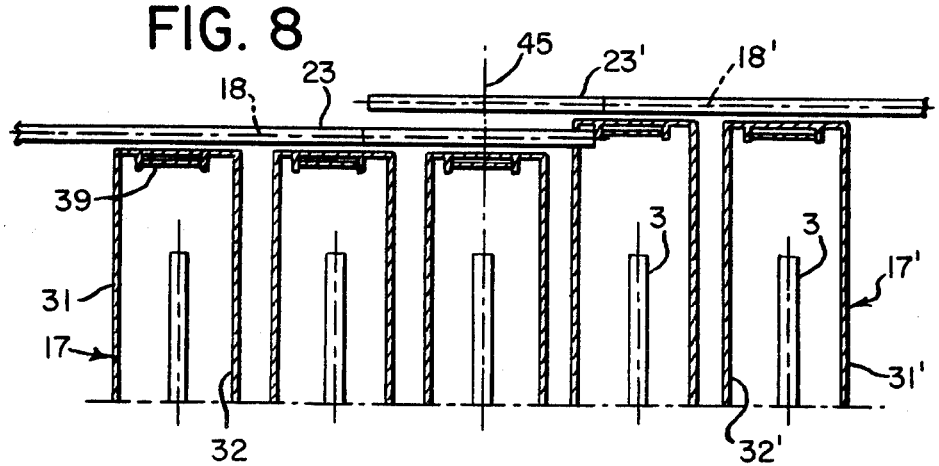
FIG. 8 is a plan view of part of the drop collector of FIG. 7.

Drop collector 15 comprises two series 16 and 16' of parallel gutters 17 and 17' (see FIG. 3). Series 16 gutters 17 is borne by a pair of movable endless chains 18 (FIGS. 2, 3 and 4). Each chain 18 is carried by a set of toothed wheels 19, 20, 21, 22 and 23 (FIGS. 3 and 8). Both wheels 21 are mounted on a shaft 24, which is provided with a toothed driving wheel 25 driven by motor 26 through a chain 27. Toothed wheels, 19, 20, 22 and 23 turn freely around non represented shafts. Aforementioned shafts as well as motor 26 are mounted in a frame 28, which is rigidly fastened through beams 29 to carriage 7 (FIG. 2). When motor 26 causes wheels 21 to turn clockwise, the series of gutters 16 passes from a lower work position, in which the gutters are juxtaposed and positioned under electrodes 3, over an intermediary position, where it is curved (FIG. 6), to a higher rest position, indicated by dotted lines on FIG. 3, in which the gutters 17 are superposed. When afterwards motor 26 causes wheels 21 to turn in reverse direction, series 16 is brought back in its lower work position by chains 18.

Figure 6:
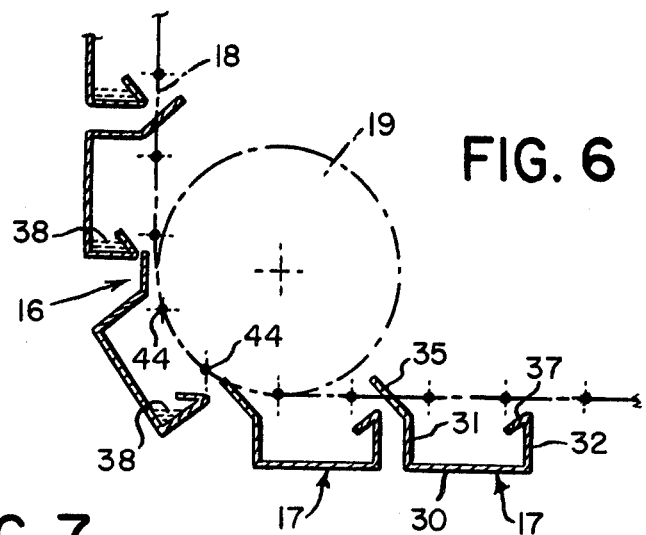
FIG. 6 is an enlarged and more detailed view of part of the drop collector of FIG. 3 at the moment a series of gutters is in intermediary position.
Figure 7:
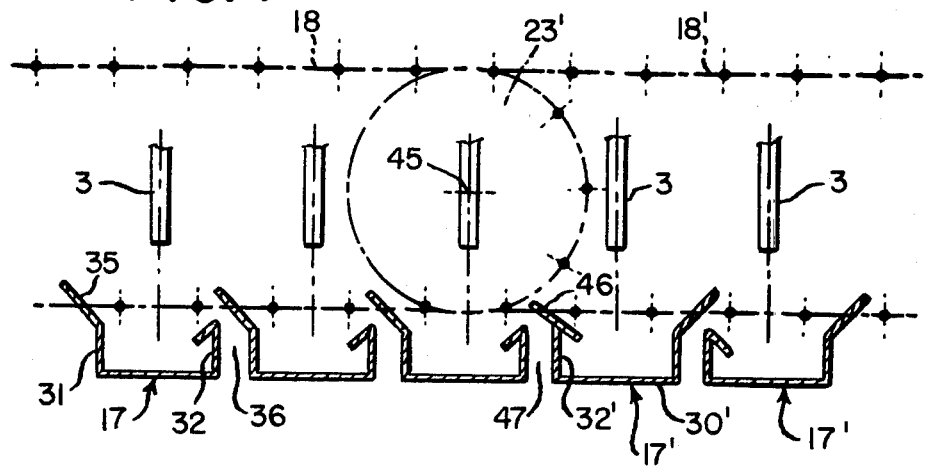
FIG. 7 is an enlarged and more detailed view of the central part of the drop collector of FIG. 3.

Each gutter 17 comprises a bottom 30, a longitudinal front wall 31, a longitudinal back wall 32 and two side walls 33 and 34. Longitudinal front wall 31 is that one that is at a higher level, when the series of gutters 16 is in the rest position, and the longitudinal back wall is that one that at the same moment is at a lower level. As shown in FIGS. 3, 6 and 7, the upper part 35 of longitudinal front wall 31 is inclined to the outside of gutter 17 so as to form a penthouse over space 36 between the lower part of this wall and longitudinal back wall 32 of the gutter preceding immediately the gutter concerned. The upper part 37 of longitudinal back wall 32 of gutter 17 is inclined to the inside of the gutter in such a way that gutter 17 can retain electrolyte 38, when the series of gutters 16 is in the rest position (see FIG. 6).

Figure 5:
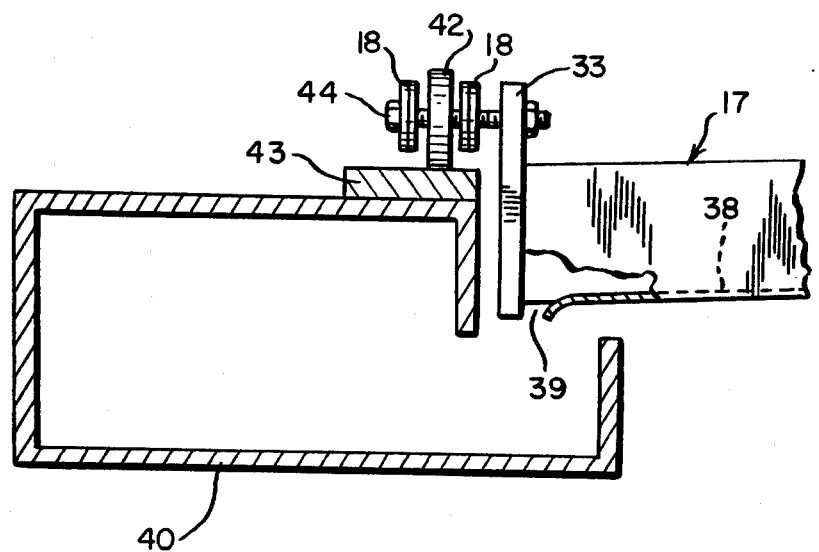
FIG. 5 is an enlarged and more detailed view of the left end of the drop collector of FIG. 4.

An orifice 39 to drain off electrolyte 38 is provided at both ends of gutter 17 in its bottom 30 (FIG. 4 and 5). Electrolyte 38 flows through outlets 39 in the reservoirs 40 and 41, which are also the lower beams of frame 28. Outlets 39 are remote from the longitudinal back wall 32 (see FIG. 8) so that this wall can form together with the bottom 30 and side walls 33 and 34 a provisional reservoir for electrolyte 38, when gutter 17 is in the rest position (see FIG. 6). To avoid stagnation of the electrolyte in gutter 17, this gutter consists of two parts rising to its center as shown in FIG. 4.

Chains 18 are hollow bearing pin chains with rollers 42. Such chains are commercially available. An element 43 for supporting and/or guiding the rollers 42 of the lower run of chains 18 can be provided on reservoirs 40 and 41. The left side wall 33 of the gutter 17 is connected with the left chain 18 by two bolts 44 passing through two successive pins of chain 18. The right side wall 34 of the gutter 17 is connected in the same way to the right chain 18 (FIGS. 4, 5, and 6).

Like the left series 16 of gutters 17, the right series 16' of gutters 17' is carried by a set of toothed wheels 19', 20', 21', 22', and 23'. Both wheels 21' are mounted on a shaft 24' which is provided with a toothed driving wheel 25' driven by motor 26' through chain 27'. Toothed wheels 19', 20' and 22' turn freely around non-represented shafts. Aforementioned shafts as well as motor 26 are mounted in frame 28. The first toothed wheel 23' turns freely around the shaft of the first toothed wheel 23 and the second toothed wheel 23' turns freely around the shaft of the second toothed wheel 23. Hence, both pairs of toothed wheels 23 and 23' have a common horizontal geometric axis 45 so that the series of gutters 16 and 16' can form one single collector when in the work position (see FIGS. 3, 7 and 8). Hence, the distance between pair of chains 18 must differ from the distance between pair of chains 18'. In the present case, the distance between pair of chains 18' is larger than the distance between pair of chains 18; gutters 17' are longer than gutters 17 (see FIG. 8) so that the same type of bolt 44 can be used to mount gutters 17 and 17' respectively on chains 18 and 18'.

Apart from the difference in length, a gutter 17' is the reflected image of a gutter 17. As shown in FIGS. 3 and 7, gutter 17', by which series 16' ends, differs from the other gutters 17' in that its longitudinal back wall 32' is surmounted by a penthouse 46 extending on both sides of this wall. The upper part of penthouse 46 extends over space 47 that exists between the series 16 and 16', when these are in work position, so that, at that moment, a tight collector is formed. The lower part of penthouse 46 extends over bottom 30' of the gutter so that this end gutter can retain electrolyte 38 as do the other gutters 37', when the series of gutters 16' is in rest position.

Drop collector 15 operates as follows. The series of gutters 16 and 16' are in rest position, when rack 8 is lowered for taking cathodes 3 and when rack 8 loaded with cathodes 3 is lifted. As soon as rack 8 loaded with cathodes 3 reaches its high conveying position (shown in FIG. 2), series 16 and 16' are brought in their work position. The conveyance of the loaded rack, by means of crane 6 and carriage 7, can start now. Electrolyte 38 dripping off cathodes 3 during this conveying flows via gutters 17 and 17' into reservoirs 40 and 41, where it can be drawn off from time to time by known and non-represented means. When rack 8 loaded with cathodes 3 arrives at its destination, the series of gutters 16 and 16' are brought back in their rest positions. Electrolyte 38 that is still in gutters 17, 17' at the moment series of gutters 16, 16' pass from their work position into their rest position, flows at that moment towards the longitudinal back wall 32, 32' of the gutters and it remains retained in the reservoir formed by this wall, by bottom 30, 30' and by side walls 33 and 34, 33' and 34' (see FIG. 6) until the series 16 and 16' return again to their work position.

It should be understood that the invention is by no means restricted to the above described embodiment and that it can be modified in many ways without departing from the scope of the present patent application.

Figure 9:
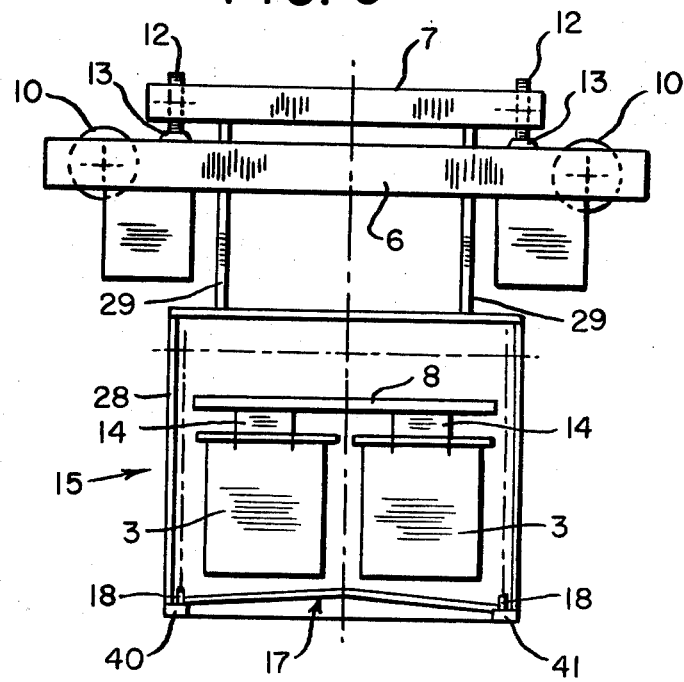
FIG. 9 represents a variant of the conveying installation of FIG. 2.

For instance, instead of providing two series 16 and 16' of gutters, one single series 16 or 16' can be provided, when the conveying apparatus 5 is equipped with a rack having a noticeably smaller length than rack 8 shown on FIG. 3, for instance a rack with sixteen pairs of hooks 14. When conveying apparatus 5 is equipped with a double rack, such as described for instance in patent application No. EP-A-0044594, it is enough to provide for longer gutters 17, 17' as shown in FIG. 9.

Figure 10:
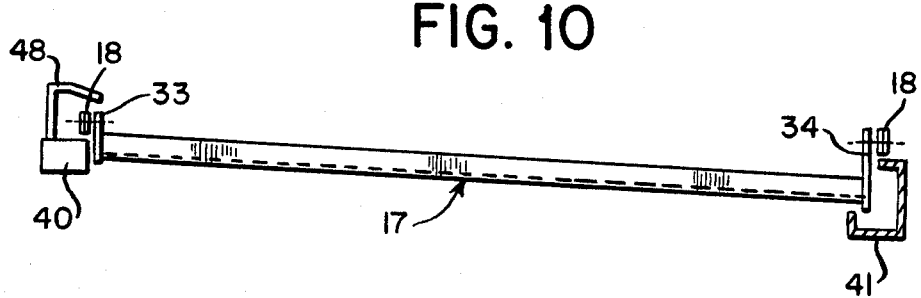
FIG. 10 represents a variant of the drop collector of FIG. 4.

Instead of using gutters 17 with a double slope as shown on FIG. 4, a gutter 17, 17' can be used, the bottom of which slopes over its entire length to one of the side walls, e.g. to the right side wall 34, as shown in FIG. 10. This gutter has one single outlet located at the lower end of the gutter and the left beam 40 does not operate as a reservoir.

It is also possible to provide for sprinkling means 48, for instance as shown in FIG. 10, to clean the gutters from time to time, which may be useful when electrolyte 38 contains a solid phase, in particular electrolysis slimes.

We claim:

1. A drop collector for an apparatus for conveying dripping electrodes having a carriage and a rack for electrodes suspended from the carriage, said drop collector comprising:
   (a) a series of parallel gutters, each gutter having at least one outlet orifice,
   (b) means for bringing said series of gutters from a lower work position, in which the gutters are juxtaposed and located under the electrodes, through an intermediary position, in which said series of gutters is curved, to a higher rest position, in which the gutters are superposed, and vice versa,
(c) a reservoir, the entry of which is located under the outlet orifices of the gutters, when said series of gutters is in the work position, and
(d) a frame fastened to the carriage of the conveying apparatus and in which said means for bringing and said reservoir are disposed.

2. Drop collector according to claim 1 wherein
 (a) the gutters further include a bottom, a longitudinal front wall, a longitudinal back wall, a first side wall and a second side wall, the longitudinal front wall being at a higher level and the longitudinal back wall at a lower level, when said series of gutters is in the rest position, and
 (b) said means for bringing further include,
   (1) a pair of endless chains, a segment of the first chain being located near the first side walls of the gutters and the corresponding segment of the second chain being located near the second side walls of the gutters,
   (2) means for connecting the segment of the first chain to the first side walls of the gutters and the segment of the second chain to the second side walls of the gutters,
   (3) a set of toothed wheels for carrying each of the endless chains, and
   (4) means for driving the endless chains.

3. Drop collector according to claim 2, wherein the endless chains are hollow bearing pin chains and the connection means comprise for each side wall two bolts passing through two successive pins of the chain.

4. Drop collector according to claim 3, wherein the hollow bearing pin chains are equipped with rollers and the frame includes means for supporting the rollers of the lower run of the chains.

5. Drop collector according to claim 2, wherein the upper part of the longitudinal front wall is inclined to the exterior of the gutter so that a penthouse is formed over the space that exists between the lower part of this wall and the longitudinal back wall of the preceding gutter.

6. Drop collector according to claim 5 wherein the upper part of the longitudinal back wall is inclined to the inside of the gutter and the outlet orifice is remote from this wall so that the gutter can retain liquid when said series of gutters is in the rest position.

7. Drop collector according to claim 2 wherein the upper part of the longitudinal back wall is inclined to the inside of the gutter and the outlet orifice is remote from this wall so that the gutter can retain liquid when said series of gutters is in the rest position.

8. Drop collector according to claims 2, 3, 4, 5 or 7 wherein the gutters further include two parts rising to the center of the gutter, outlet orifices being provided at both ends in bottom of the gutter, and said frame further includes two hollow beams forming said reservoir.

9. Drop collector according to claims 2, 3, 4, 5 or 7 wherein the gutters have a bottom which slopes over its whole length to one side wall of the gutter, an outlet orifice is provided in the bottom near said side wall, and said frame further includes one hollow beam forming said reservoir.

10. Drop collector according to claims 2, 3, 4, 5 or 7 which further includes a second series of gutters and means for bringing this second series from a lower work position to a higher rest position and vice versa so that both series of gutters form a collector unit, when they are in work position, and that they face each other when they are in the rest position.

11. Drop collector according to claim 10, which further includes in the vicinity of the place where both series of gutters abut in their work position, two pair of toothed wheels which are mounted for returning the endless chains, these toothed wheels having a common horizontal geometric axis.

12. Drop collector according to claim 11, wherein the longitudinal back wall of the last gutter of the second series is surmounted by a penthouse extending on both sides of this wall, the upper part of this penthouse extending over the space that exists between both series of gutters in work position.

13. Drop collector according to claims 1, 2, 3, 4, 5 or 7 which further includes sprinkling means to clean the gutters.

* * * * *